(No Model.)
H. C. McBROOM.
LAND MARKER.
No. 482,062. Patented Sept. 6, 1892.
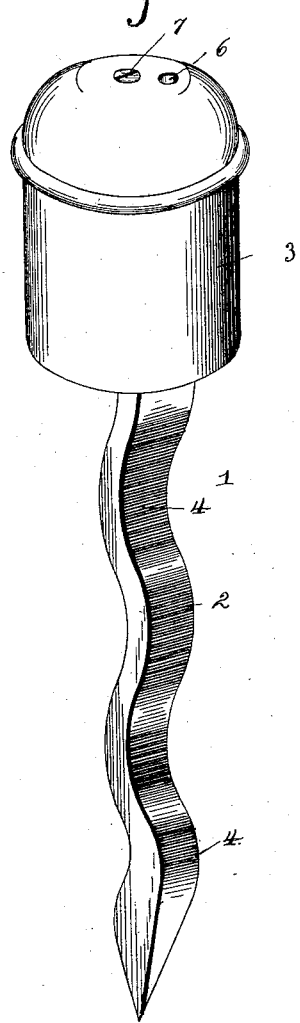
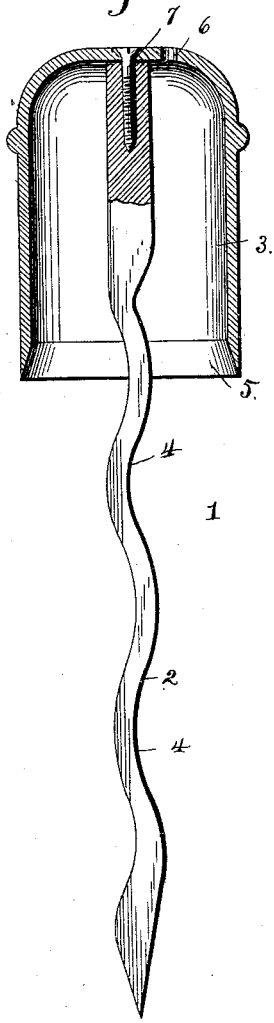
Witnesses
Chas. A. Ford
N. F. Riley
Inventor
Henry C. McBroom.
By his Attorneys,
C. A. Snow & Co.

UNITED STATES PATENT OFFICE.

HENRY C. McBROOM, OF NASHVILLE, TENNESSEE.

LAND-MARKER.

SPECIFICATION forming part of Letters Patent No. 482,062, dated September 6, 1892.

Application filed September 11, 1891. Serial No. 405,413. (No model.)

*To all whom it may concern:*

Be it known that I, HENRY C. McBROOM, a citizen of the United States, residing at Nashville, in the county of Davidson and State of Tennessee, have invented a new and useful Land-Marker, of which the following is a specification.

The invention relates to improvements in devices for marking land.

The object of the present invention is to provide a simple, inexpensive, and durable device adapted to be employed in place of the ordinary stakes usually used by engineers in laying out land.

The invention consists in the construction and novel combination and arrangement of parts hereinafter fully described, illustrated in the accompanying drawings, and pointed out in the claim hereto appended.

In the drawings, Figure 1 is a perspective view of a land-marker constructed in accordance with this invention. Fig. 2 is a longitudinal sectional view.

Like numerals of reference designate corresponding parts in both figures of the drawings.

1 designates a land marker or stake constructed of metal and composed of a spike 2 and a cylindrical cap 3, arranged over the upper end or head of the spike and either secured thereto or formed integral therewith. The marker is coated with a suitable paint or waterproofing compound to prevent it rusting out or being injured by the weather and is adapted to be readily driven into the ground similar to the ordinary stake employed by civil engineers and surveyors in laying off land. The spike has a general taper toward its point and is provided throughout its length with a series of sinuous bends 4, whereby the marker will obtain a firm hold on the ground. The cylindrical cap has its upper end or top rounded and its lower edges sharpened and adapted to enter the ground readily should a vehicle pass over the marker, and the latter will not be forced to one side or drawn out of the ground by such a vehicle. The upper end or top of the cap is provided with a perforation 6, which forms a vent to permit the escape of water or air when the cap is forced into the ground, as water might accumulate in the cap. The cap when constructed separate from the spike is secured thereto by a screw 7, which passes through a centrally-arranged countersunk opening of the cap and engages a threaded opening in the upper end or head of the spike.

It will be seen that the marker is simple and inexpensive in construction, strong and durable, and is adapted to be readily driven into the ground and of securely retaining its proper position.

What I claim is—

A marker comprising a spike having a series of sinuous bends and provided in its head with a threaded socket, a cylindrical cap fitting over the head of the spike and having a central opening in its top and with a perforation near the opening and having its lower edge sharpened and adapted to be driven into the ground, and a screw passing through the central opening of the cap and engaging the threaded socket of the spike, substantially as described.

In testimony that I claim the foregoing as my own I have hereto affixed my signature in the presence of two witnesses.

HENRY C. McBROOM.

Witnesses:
 ED. STRUBE,
 C. E. BELL.